United States Patent [19]

Orloski

[11] Patent Number: 4,998,594
[45] Date of Patent: Mar. 12, 1991

[54] VEHICLE CONTROL TRAINING DEVICE

[76] Inventor: John C. Orloski, 6613 SE. Penny La., Bartlesville, Okla. 74006

[21] Appl. No.: 445,208

[22] Filed: Dec. 4, 1989

[51] Int. Cl.⁵ .............................................. B60P 3/06
[52] U.S. Cl. .................. 180/198; 180/209; 280/43.23; 254/2 C
[58] Field of Search ............ 180/198, 209; 280/43, 280/704, 709, 86, 87.2, 702, 414.5, 43.23; 254/2, 2 C, 45; 105/215.2; 414/465, 589, 678

[56] References Cited

U.S. PATENT DOCUMENTS 2,933,322  4/1960  Derse .............................. 280/5.2
3,844,421  10/1974  Nielson ............................ 414/678
4,700,798  10/1987  Johansson et al. ................ 180/209

Primary Examiner—Richard A. Bertsch
Assistant Examiner—Kevin Hurley
Attorney, Agent, or Firm—Robert K. Rhea

[57] ABSTRACT

A driver training apparatus for simulating skid conditions of a vehicle which includes a lifting frame supported by four caster wheels which underlies and is connected with the vehicle suspension system and is propelled by the vehicle. Under normal driving conditions, the caster wheels turn to follow the direction of movement of the vehicle steered by the driver. Under the control of an instructor, the frame of the apparatus can raise the forward or rearward pairs of the caster wheels simultaneously or individually to raise the forward or rearward pairs of wheels of the vehicle relative to the surface of a roadway to simulate a slick road or skidding condition. Under the control of the instructor, the pivoting axis of the caster wheels can be inclined with respect to the vertical to stabilize lateral or forward movement of the vehicle when partially supported by the driver training apparatus.

6 Claims, 2 Drawing Sheets 4,998,594

1

VEHICLE CONTROL TRAINING DEVICE

BACKGROUND OF THE INVENTION

1. Field of the Invention

This invention relates to an apparatus for permitting regulatable variation of the friction grip between the wheels of a car and a supporting surface. This invention is directed toward over-the-road vehicles and more particularly to driver training for various types of road conditions simulated by reducing the coefficient of rolling friction between the wheels of a car and a roadbed.

Heretofore such training usually has been achieved by providing special roadbeds in which a friction reducing material was spread over the surface of the roadbed before placing a car with a driver to be trained thereon.

The principal disadvantage of this method resides in the expense of preparing such a road surface and thereafter removing the friction reducing material. Further, it requires a preferably level surface such as a parking lot and in areas of high land use such areas are relatively expensive particularly when such road surfaces are used only for driver training.

2. Description of the Prior Art

U.S. Pat. No. 4,700,798 discloses a driver training apparatus for simulating skidding conditions of automobiles. This patent discloses a frame which underlies the frame of a vehicle and is connected with its suspension system and further provides caster wheels adjacent but spaced outwardly from the respective automobile wheel with these caster wheels being elevated or lowered relative to the automobile supporting frame for reducing the frictional contact between the car wheels and the surface of a roadbed.

This invention is distinctive over this patent by providing forward and rearward articulating axles which support caster wheels in outrigger fashion relative to the four wheels of a car, raise and lower the caster wheels relative to the car and act to tilt the pivoting axis of the caster wheels in a forward or rearward direction with respect to the vertical which achieves a forward steering stabilizing effect on the car in any situation whether turning in forward direction or during a simulated skid. Further, these articulated axles act as breaking means if necessary.

SUMMARY OF THE INVENTION

An auxiliary frame assembly having forward and rearward pairs of pivoting caster wheel assemblies at its respective ends underlies a vehicle frame in vertically adjustable relation relative to a common supporting surface for simulating various road surface conditions by a variation of the vehicle load on its tires achieved by an onboard fluid power unit under the control of a driver trainer which allows fully variable front to rear distribution and amplitude of the vehicle load on its tires and a tilting of the caster wheels pivot axis from the vertical for lateral and forward directional stability of the vehicle.

The principal objects of this invention are, to provide an apparatus enabling winter driving training of drivers on substantially any firm dry supporting surface which is generally planar and to include emergency control features enabling emergency stabilization of the vehicle by the driver instructor in lateral and forward directions when deemed necessary.

DESCRIPTION OF THE PREFERRED EMBODIMENTS

Figure 1:
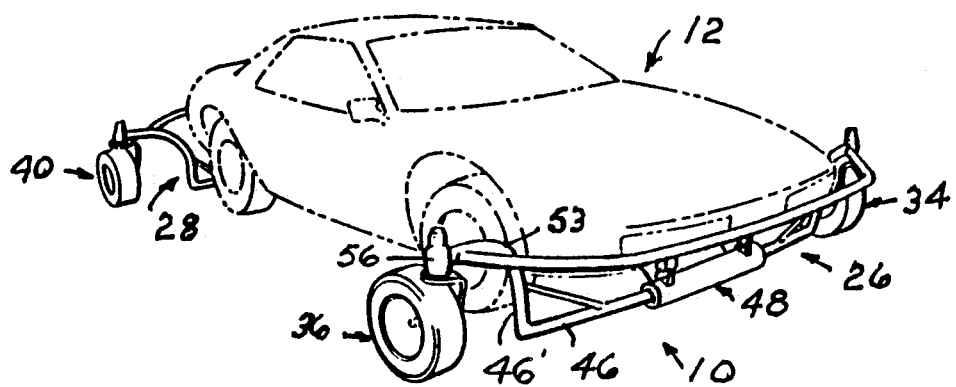
FIG. 1 is a perspective view of the device in supporting relation under a vehicle the latter being shown by broken lines.
Figure 2:
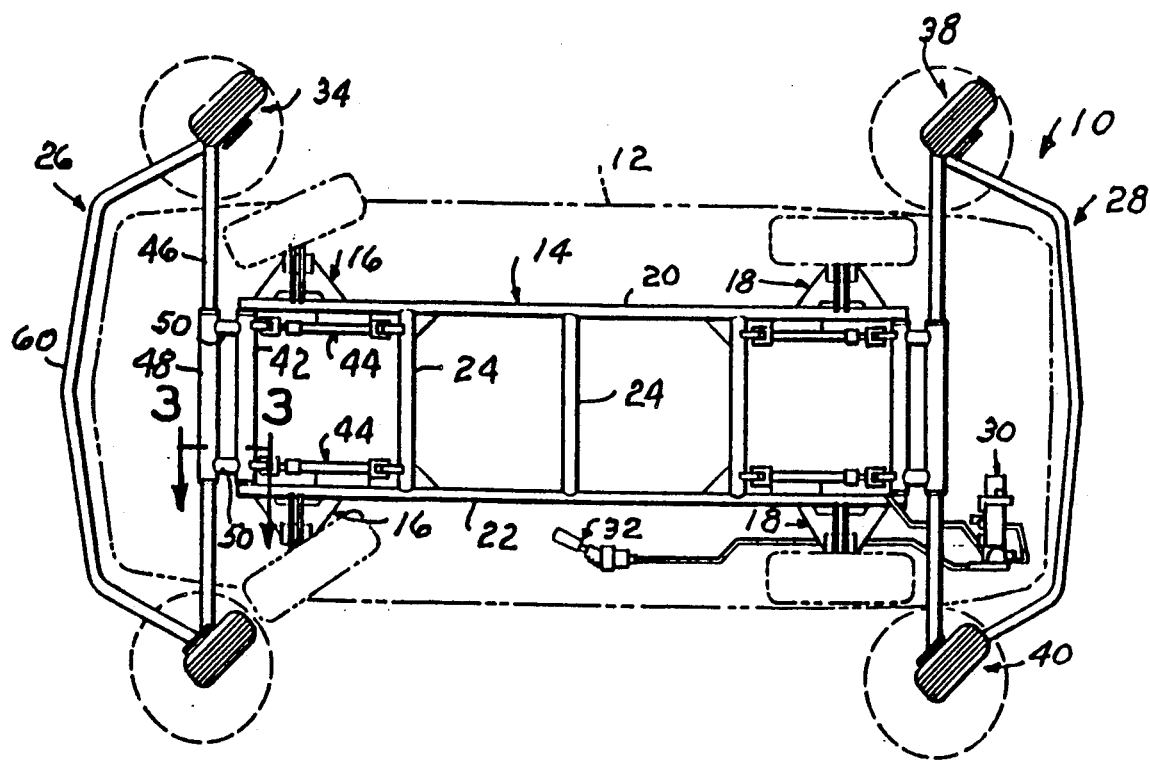
FIG. 2 is a bottom view of the apparatus and its relative position with respect to the vehicle of FIG. 1.

Like characters of reference designate like parts in those figures of the drawings in which they occur.

In the drawings:

The reference numeral 10 indicates the apparatus as a whole underlying a conventional passenger car 12. The apparatus 10 comprises a generally rectangular auxiliary frame 14 underlying and secured at its forward and rearward end portions, to the forward and rearward vehicle axle suspension means 16 and 18, respectively.

The frame 14 further comprises longitudinal side members 20 and 22 which are interconnected by transverse brace members 24 at their respective end portions and medially its ends.

The device 10 further comprises forward and rearward caster wheel supporting articulating axle means 26 and 28. A fluid cylinder power means 30 is supported by the vehicle or car 12 and operated by a driver instructor by a control means 32.

The forward and rearward axle means 26 and 28 respectively support forward and rearward pairs of caster wheels 34–36 and 38–40. Since the forward and rearward axle means 26 and 28 are substantially identical, only the forward axle means 26 is described in detail.

Figure 3:
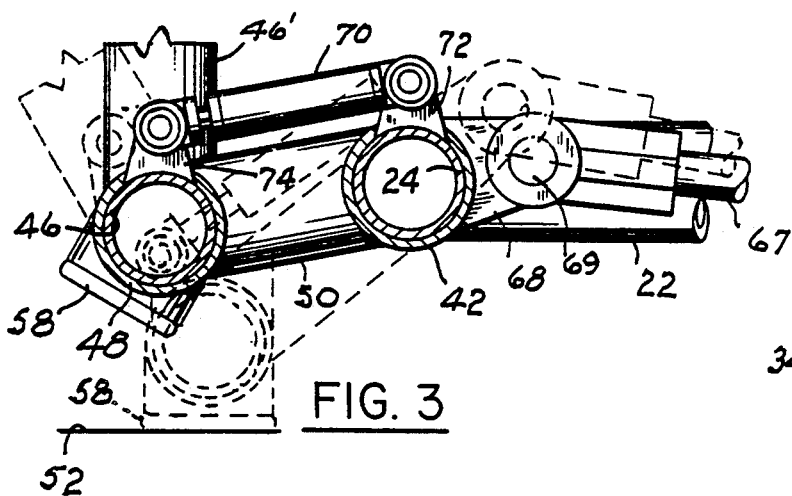
FIG. 3 is a fragmentary vertical cross sectional view, to a larger scale taken substantially along the line 3—3 of FIG. 2, partially in elevation and illustrating the movement of and angular rotation of the caster wheel supporting axles.
Figure 4:
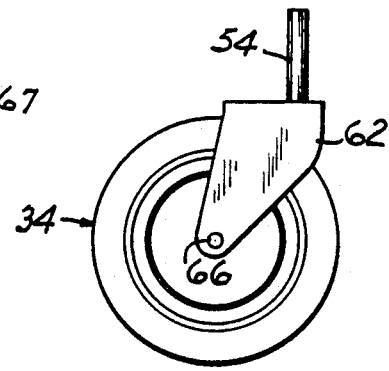
FIG. 4 is a side elevational view of the normal position of one of the caster wheels per se.

The cross brace 24 (FIG. 3) at the forward end of the frame 14 longitudinally journals a sleeve 42 for angular rotation about its axis by a pair of power cylinders 44 as hereinafter explained. An elongated axle 46 extends parallel with the sleeve 42 and projects beyond the respective lateral limits of the vehicle or car 12 for supporting the forward pair of caster wheels 34–36. A second sleeve 48 surrounds the axle 46 medially its ends for journaling the axle. The sleeve 48 is rigidly connected with the sleeve 42 by a pair of struts 50 for the purposes presently explained.

As shown by FIG. 1, the major portion of the axle 46 extends in selected spaced relation above and parallel with the surface of the earth 52 (FIG. 3) toward the respective side portion of the vehicle where it turns upward as at 46' and laterally outward as at 53 so that its terminal ends are in the plane of the caster wheel pivoting axle 54 and is rigidly secured with bearing means 56 journaling the caster wheel axle. Additionally, the axle 46 is provided at selected locations intermediate its ends with a depending lug supporting a brake pad 58 formed from conventional braking material for the purposes presently explained. The axle means 26 further includes a stabilizer bar 60 extending transversely of the vehicle forwardly of its adjacent end surface and is turned rearwardly at its respective ends and connected with the respective end portion of the axle 46 adjacent its connection with the bearings 56.

The caster wheels being substantially identical, only the caster wheel 34 is described in detail. Caster wheel 34 is provided with an angular wheel bracket 62 having a normally horizontal top portion 64 to which the axle 54 is rigidly connected in upstanding relation. The bracket 62 is provided with wheel bearing means at its depending end for horizontally journaling the axle 66 of the wheel 34.

The piston end of the power cylinders 44 are pivotally connected with an adjacent cross brace 24 and the piston rod 67 of each cylinder 44 is pivotally connected with a lug 68 rigidly secured to the sleeve 42. The horizontal axis of the pivoting connection 69 between the power cylinder rod 67 and the lug 68 is offset upwardly above the horizontal plane defined by the frame side members 20 and 22 to insure that when the piston rod 67 is extended the struts 50 are pivoted downwardly at their ends connected with the axle surrounding sleeve 48 to prevent an "on center" alignment or "locked" position of the piston rod 67 and lug 68 during raising or lowering action of the axle 46 and its connected caster wheels as presently explained.

Figures 5, 6, 7:
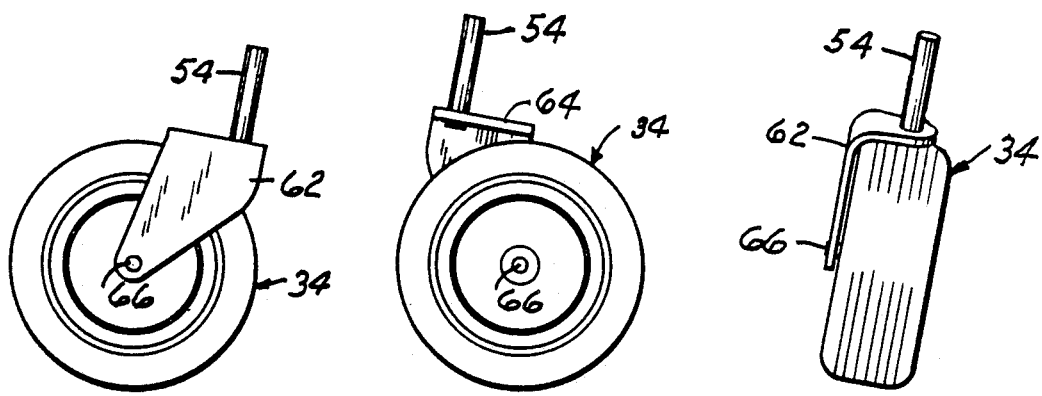
FIGS. 5 and 6 are elevational views of respective sides of the caster wheel of FIG. 4 when its pivoting axle is tilted from the position illustrated by FIG. 4.
FIG. 7 is a front elevational view of the caster wheel of FIGS. 5 and 6 when tilted; and, FIGS. 8 and 9 are side and front elevational views, respectively, of one of the caster wheels with pivot dampening apparatus mounted thereon.
Figures 8, 9:
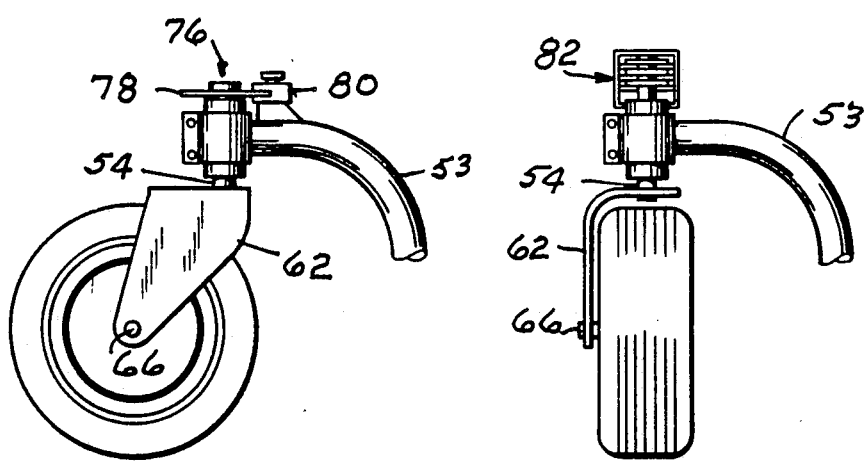

Referring again to FIG. 3, a caster wheel axle articulating, double acting power cylinder 70, is connected at its respective ends parallel with the respective strut 50 between a pair of lugs 72 and 74 respectively rigidly secured to the forward frame cross member 24 and the axle 46. Extending the piston rod of the cylinder 70 angularly rotates the axle 46 about its longitudinal axis parallel with the surface of the earth and tilts its outward end portions 46' to tilt the axles 54 of the connected caster wheels 34–36 in the direction as illustrated by FIGS. 5 and 6. By tilting the axis of the caster axle 54 in a fore or aft direction from the vertical, the net effect is to generate a vertical displacement component at the pivot axis at any angle of horizontal rotation of the caster wheel 34. The resolution of forces and moments about the pivot axis relative to the point of ground contact of the caster wheel show that tilting the caster pivot axis in the manner described produces significant lateral centralizing forces on the caster wheel at the point of ground contact. The greater the angle of the pivot axis from vertical, the greater these lateral centralizing forces at rotation angles in either direction from the normally zero position wheel angle. Tilting the front and rear caster wheel pivot axes toward the front of the vehicle will make it stabilize toward the straight-ahead.

The benefit of this capability is providing variable degrees of directional stability through what is in effect steering forces. This effect can be introduced dynamically through changes in length of hydraulic control links or can be set up statically with standard adjustable control links. This capability is of great value when the device is used for certain braking maneuvers and for vehicle brake system development. It can also be used when the vehicle is on a limited area of pavement and free spinning of the vehicle is not desirable.

An additional benefit of this capability is the braking action of the device independently of the vehicle brake system. When the caster pivot axis is tilted away from vertical, the center of the caster wheel in its stabilized position will move further from the center of the supporting axle 46. This movement will drop the axle 46 closer to the roadbed 52.

To increase the versatility of the apparatus in high speed driver training and test work, dampers are fitted to the caster pivot axle to reduce the tendency of caster oscillation due to impact with road surface irregularities, particularly in a lightly loaded condition or during momentary contact (such as in cornering roll of the vehicle). One dampening device 76 is axially mounted on the upper end portion of the caster axle 54 and a flange 78 rigidly connected axially with the caster axle engages an adjacent flange gripping device 80. The grip 80 is manually adjustable to produce a desired resistance or breaking effect on the rotational movement of the flange and caster wheel. Alternatively a concentric fluid rotational device 82 may be mounted on the caster axle in lieu of the friction resistance damper assembly 76 for providing a desired preset dampening effect hampering the rotational action of the respective caster as desired.

The power unit 30 is substantially conventional comprising a fluid pump, not shown, which supplies fluid pressure to the respective cylinders 44 and 70 by valve equipped conduits under the control of the driver instructor at the passenger position of the vehicle 12. The controls 32 are manually accessed for operating the pump and extending and retracting the cylinders 44 and 70. Further, the controls 32 permit an emergency control wherein the instructor can quickly release or return all cylinders to their unactivated position so that the standard vehicle wheels support the vehicle on the roadway surface with the respective pairs of caster wheels elevated above the surface of the earth 52.

Operation

Operation of the apparatus seems obvious from the above description but briefly stated and assuming the apparatus has been installed on a vehicle 12 as described hereinabove, the vehicle is moved to a desired location such as an empty unobstructed parking lot, not shown. The driving instructor, by operating the controls 32, starts the hydraulic pump and lowers the front or rear caster wheel assemblies 26 and 28 relative to the vehicle and the surface of the roadbed 52 so that the vehicle wheels are in light contact with the surface of the roadbed 52. The amount of contact is variable and is set in accordance with a particular type of driver training desired and by the experience of the instructor in suing the several control particular components of the unit. Thereafter the driver trainee moves the vehicle 12 in any desired maneuver as suggested by the instructor.

Obviously the invention is susceptible to changes or alterations without defeating its practicability. Therefore, I do not wish to be confined to the preferred embodiment shown in the drawings and described herein.

I claim:

1. An apparatus for reducing the normal coefficient of gripping friction between the tires of a vehicle and the surface of a roadbed, comprising:
   generally horizontal rectangular auxiliary frame means for underlying a vehicle frame normally supported by tire equipped wheels, said auxiliary frame means including elongated side members transversely interconnected by end and intermediate cross braces, a coextensive first sleeve journaled by the respective end cross brace and connected with said outrigger means, and, fluid pressure operated means supported by said auxiliary frame and connected with said first sleeve for angular rotation of the latter and raising and lowering said outrigger means;

outrigger means including pairs of caster wheels disposed laterally of respective ends of said auxiliary frame means for horizontal pivoting movement about upright axes; and, manually operated control means for selectively raising and lowering said pairs of caster wheels by pairs or in unison relative to a vehicle frame and simultaneously tilting the caster wheel pivot axes by pairs relative to their normally vertical axis.

2. The apparatus according to claim 1 in which said outrigger means includes:

an elongate axle adjacent and generally parallel with said first sleeve and extending at its respective end portions beyond the lateral limits of the respective end portions of a vehicle, and, caster wheel means journaled by the respective end of said axle for angular rotation in a horizontal plane about a vertical axis.

3. The apparatus according to claim 2 in which the outrigger means further includes:

a second sleeve surrounding said axle medially its ends; and, struts interconnecting said first and second sleeves.

4. The apparatus according to claim 2 and further including:

an elongated stabilizer bar connected at its respective ends with respective ends of said axle in upward and forwardly spaced relation with respect to said axle and the adjacent end of a vehicle.

5. The apparatus according to claim 4 in which the respective end portions of said axle are turned upwardly and laterally outward from the adjacent lateral limit of said vehicle.

6. The apparatus according to claim 5 and further including:

other pressure cylinder means extending transversely between and operatively connected with the respective auxiliary frame end cross brace and said axles independently of said first and second sleeves for angular rotation of said axle relative to said second sleeve.

* * * * *